(12) United States Patent
Allmaras et al.

(10) Patent No.: US 12,462,595 B2
(45) Date of Patent: Nov. 4, 2025

(54) TRAINING DATA GENERATOR AND METHOD FOR GENERATION OF TRAINING DATASETS

(71) Applicant: Siemens Aktiengesellschaft, Munich (DE)

(72) Inventors: Moritz Allmaras, Munich (DE); Tim Schenk, Landshut (DE); Jan Christoph Wehrstedt, Munich (DE); Harald Held, Bockhorn (DE); Steffen Limmer, Munich (DE); Ulli Herzog, Leimen (DE); Sascha Heß, Bietigheim (DE); Klaus Walter Wendelberger, St. Leon-Rot (DE); Till Heinzerling, Stutensee (DE); Julian Knittel, Maulbronn (DE)

(73) Assignee: Siemens Aktiengesellschaft, Munich (DE)

( * ) Notice: Subject to any disclaimer, the term of this patent is extended or adjusted under 35 U.S.C. 154(b) by 226 days.

(21) Appl. No.: 18/035,802

(22) PCT Filed: Oct. 19, 2021

(86) PCT No.: PCT/EP2021/078861
§ 371 (c)(1),
(2) Date: May 8, 2023

(87) PCT Pub. No.: WO2022/100965
PCT Pub. Date: May 19, 2022

(65) Prior Publication Data
US 2023/0401880 A1 Dec. 14, 2023

(30) Foreign Application Priority Data
Nov. 16, 2020 (EP) .................................. 20207873

(51) Int. Cl.
*G06V 30/422* (2022.01)
*G06N 3/09* (2023.01)
(Continued)

(52) U.S. Cl.
CPC ............. *G06V 30/422* (2022.01); *G06N 3/09* (2023.01); *G06T 11/206* (2013.01); *G06V 30/19147* (2022.01)

(58) Field of Classification Search
CPC .. G06V 30/422; G06V 30/19147; G06N 3/09; G06T 11/206
See application file for complete search history.

(56) References Cited

U.S. PATENT DOCUMENTS

2017/0316082 A1\* 11/2017 McQueary ............ G06F 16/285
2019/0080164 A1\* 3/2019 Duke .................. G06V 30/422

OTHER PUBLICATIONS

Luoting Fu et al: "From engineering diagrams to engineering models: Visual recognition and applications", Computer-Aided Design, Elsevier Publishers BV., Barking, GB, Bd. 43, Nr. 3, Dec. 25, 2010 (Dec. 25, 2010), pp. 278-292, XP028144142, ISSN: 0010-4485, DOI: 10.1016/J.CAD.2010.12.011 [found on Dec. 1, 2010].
(Continued)

*Primary Examiner* — Xin Sheng
(74) *Attorney, Agent, or Firm* — Schmeiser, Olsen Watts, LLP

(57) ABSTRACT

A training data generator includes an interface to read symbols extracted from digital system plans for technical systems, wherein each of the system plans represents the design and/or the functionality of a technical system by of symbols, and the system plans are identical. The training data generator also includes a storage module which is designed to store the extracted symbols, a selection module which is designed to randomly select a symbol sub-quantity of the stored symbols using a random generator, a generator which is designed to generate at least one synthetic system
(Continued)

plan on the basis of the selected symbol sub-quantity, and an output module to output the at least one synthetic system plan as training data in order to train a trainable image detection module, wherein the trainable image detection module is designed to generate a digital system plan using an analog system plan of a technical system.

12 Claims, 2 Drawing Sheets

(51) Int. Cl.
*G06T 11/20* (2006.01)
*G06V 30/19* (2022.01)

(56) References Cited

OTHER PUBLICATIONS

PCT International Search Report and Written Opinion of International Searching Authority mailed Jan. 14, 2022 corresponding to PCT International Application No. PCT/EP2021/078861 filed on Oct. 19, 2021.

* cited by examiner

TRAINING DATA GENERATOR AND METHOD FOR GENERATION OF TRAINING DATASETS

CROSS-REFERENCE TO RELATED APPLICATIONS

This application claims priority to PCT Application No. PCT/EP2021/078861, having a filing date of Oct. 19, 2021, which claims priority to EP Application No. 20207873.9, having a filing date of Nov. 16, 2020, the entire contents both of which are hereby incorporated by reference.

FIELD OF TECHNOLOGY

The following relates to a training data generator and to a method for generating training datasets for training of a trainable image detection module, as well as to a computer program product.

BACKGROUND

For setting up, design, operation and/or maintenance of technical plants and systems schematic plans/system plans are needed. As a rule these are only available for existing systems in paper form or as a graphics file. Moreover, a standardized form of exchange does not exist, so that plans often have different signs/symbols for the same technical objects, devices and/or functions or different conventions are followed in the generation or the maintenance of such plans.

For maintenance, expansion or conversion of such technical systems the plan information is needed as a digital, editable model in an engineering tool, i.e., existing paper plans must be digitized for this purpose. During digitization the detection and/or classification of symbols depicted on the plan documents is of particular importance. Methods of supervised machine learning can in particular be used for digitization. These are trained in what is known as the training phase by example plans with existing annotations of the symbols depicted there, of their type and their positions, in order later, in what is known as the inference phase, then to be able to detect the corresponding symbols in new, unknown plan documents. In order to achieve a high detection accuracy with such methods they must be trained on a very large number of annotated plan examples. However, such a large amount of training data, i.e. of system plans or symbols, is not guaranteed.

Known from US 2019/080164 A1 is a method for text detection in Piping and Instrumentation Diagram plans (abbreviated to P&ID) by means of machine learning methods.

SUMMARY

An aspect relates to create a possibility of providing a sufficient amount of training data, in order for example, for a trained method for digitization of such system plans, to achieve a high detection accuracy.

In accordance with a first aspect embodiments of the invention relates to a training data generator comprising
an interface, which is designed to read in symbols extracted from digital system plans for technical systems provided and a positioning rule provided for the positioning of a symbol in a system plan, wherein the system plans each depict a structure and/or a functionality of a technical system by means of symbols and are identical, wherein symbols depict the technical system or a technical function, and wherein the at least one positioning rule is directed to a relative positioning of the symbol on a system plan, a relative positioning of the symbol in relation to an annotation, a predetermined coupling to a further symbol, and/or a symbol-specific dependency on at least one further symbol,
a memory module, which is designed in such a way as to store the extracted symbols,
a selection module, which is designed in such a way as to select at random a symbol sub-quantity of the stored symbols by means of a random generator,
a generator, which is designed in such a way as to generate at least one synthetic system plan as a function of the selected symbol sub-quantity and as a function of at least one positioning rule, and
an output module, which is designed in such a way as to output the at least one synthetic system plan as training data for training of a trainable image detection module.

Unless stated otherwise in the description given below, the terms "carry out", "compute", "computer-assisted", "calculate", "determine", "generate", "configure", "reconstruct" and the like relate to actions and/or processes and/or processing steps that change and/or create data and/or translate the data into other data, wherein the data is in particular represented or can be present as physical variables, for example as electrical impulses. In particular the expression "computer" is intended to be interpreted as broadly as possible, in order in particular to cover all electronic devices with data processing characteristics. Computers can thus for example be personal computers, servers, programmable logic controllers (PLC), handheld computer systems, pocket PC devices, mobile radio devices and other communication devices, with can process data with computer assistance, processors and other electronic devices for data processing.

"Computer-assisted" can be understood in conjunction with embodiments of the invention for example as an implementation of the method in which in particular a processor carries out at least one method step of the method.

An inventive training data generator can comprise a processor for example. A processor can be understood in conjunction with embodiments of the invention for example as a machine or an electronic circuit. A processor can in particular involve a Central Processing Unit (CPU), a microprocessor or a microcontroller, for example an application-specific integrated circuit or a digital signal processor, possibly in combination with a memory unit for storage of program instructions, etc. A processor can for example also involve an IC (Integrated Circuit), in particular an FPGA (Field Programmable Gate Array) or an ASIC (Application-Specific Integrated Circuit), or a DSP (Digital Signal Processor) or a GPU (Graphic Processing Unit). A processor can also be understood as a virtualized processor, a virtual machine or a soft CPU. It can for example also involve a programmable processor, which is equipped with configuration steps for carrying out the said inventive method or is equipped with configuration steps in such a way that the programmable processor realizes the inventive features of the method, the components, the modules, or other aspects and/or subaspects of embodiments of the invention.

A "memory unit" or "memory module" and the like can be understood for example in conjunction with embodiments of the invention as a volatile memory (Random-Access Memory, RAM) or a non-volatile memory such as a hard disk or a data carrier.

A "module" can be understood in conjunction with embodiments of the invention for example as a processor and/or a memory unit for storage of program instructions. For example the processor is specifically designed to execute the program instructions in such a way that the processor carries out functions in order to implement or realize the inventive method or a step of the inventive method.

A "digital system plan"—also referred to below as a (digital) plan—can be understood in conjunction with embodiments of the invention in particular as a schematic diagram, a circuit diagram, a function plan, or a Piping and Instrumentation Diagram, P&ID) for a technical system. The system plan depicts the technical system, its characteristics, its function and/or information assigned to this technical system schematically. A system plan can in particular be available in digitized form, such as for example as a PDF file.

A "technical system" can be understood in conjunction with embodiments of the invention in particular as a technical system, such as for example an industrial system/a manufacturing system, a technical device or a machine or an infrastructure network, such as for example a water network, a processing system but also subaspects such as circuit diagrams, logic plans or HVACs.

A "synthetic system plan" can be understood in conjunction with embodiments of the invention in particular as a synthetically produced system plan, which for example does not depict any real technical system or is not assigned to any real technical system. In particular a synthetic system plan can be available initially as a network list, i.e., a textual description of the for example electrical, process control and/or logical connections between plan elements, created from selected symbols. In other words a synthetic system plan can also just be available as a network list.

A synthetic system plan is similar to a digitized system plan, i.e., has comparable characteristics and/or symbols. For example, a synthetic system plan differs from a system plan of a technical system in a number of symbols. A synthetic system plan can for example have enhancements or modifications to a system plan of a technical system.

A plan/system plan in particular comprises a plurality of symbols. "Symbols" can be understood in conjunction with embodiments of the invention as for example labels, connecting lines, graphical representations or the like that depict a technical system or a technical function. For example, a symbol of a piping diagram can depict a pump, a valve or a pipe. The symbols are already available extracted from at least one system plan. For example, a symbol library can be read in. In particular information that is assigned to the symbols and describes said symbols can be stored in the symbol library.

A "trainable image detection module" can be understood in conjunction with embodiments of the invention for example as an image detection software/image detection program/algorithm on the basis of a machine learning method.

An advantage of embodiments of the present invention is that a plurality of synthetic system plans can be generated automatically, which can be used as the input/training data for training of an image detection module. Any given number of realistic training examples can be created. Symbols are extracted from existing digitized system plans for this purpose. A sub-quantity of the symbols is selected at random and arranged in a synthetic system plan. In particular a network list of the selected symbols can be created from the sub-quantity and from this a synthetic system plan can be generated, in graphical representation for example.

A further advantage is produced since in particular a (manual) description/classification of individual symbol entities (and their connection points) represents a significantly lower technical effort than the (manual) description/classification of a large number of as-built plans. The description/classification can thus be converted from a (complex) entity-based method of operation into an efficient type-based method of operation. Thus a multiply higher degree of flexibility, scaling, throughput and automation is achieved.

In one form of embodiment of the training data generator the interface can further be designed additionally to read in at least one of the following items of additional information assigned to a respective symbol and to transfer it to the memory module for storage of this item of additional information:
  an item of information assigned to a system about a possible connection to another symbol,
  an item of information in relation to an annotation assigned to a symbol, such as for example a label,
  a form of representation of the symbol and/or part of the symbol and/or
  an item of representation information of the symbol.

In this way a realistic or usual form of embodiment of the respective symbols can be achieved. This additional information can for example be stored in a symbol library. Moreover this makes it possible to achieve a greater variation of the symbols. Thus for example an annotation or a form of representation of a symbol can be modified in order to generate a different symbol representation and thus also different synthetic system plans.

In one form of embodiment of the training data generator the interface can further be designed to read in a relative position for the symbol and/or dimension of the annotation for an annotation.

In this way a usual representation of a symbol can be stored and thus easily reproduced.

In one form of embodiment of the training data generator the generator can further be designed to generate at least one synthetic system plan as a function of an item of additional information.

For example, at least one item of additional information assigned to a symbol can be taken into account in the generation of a synthetic system plan. This makes possible the generation of realistic synthetic system plans.

In one form of embodiment of the training data generator the interface can further be designed to read in at least one positioning rule provided for the positioning of a symbol in a system plan.

In one form of embodiment the at least one positioning rule can be directed to
  a relative positioning of the symbol on a system plan,
  a relative positioning of the symbol in relation to an annotation,
  a predetermined coupling to a further symbol, and/or
  a symbol-specific dependence on at least one further symbol.

In one form of embodiment of the training data generator the generator can further be designed to generate the synthetic system plan as a function of at least one positioning rule.

The plan generation taking into account a positioning rule makes it possible for example to prevent symbol connections and/or placings that are not permitted or not wanted as much. Moreover, the legibility and the clarity of the synthetic system plan can be increased.

In one form of embodiment of the training data generator the generator can further be designed to generate the synthetic system plan taking into account at least one predetermined boundary condition of the system plan.

A boundary condition can for example be a predetermined size or a predetermined format of the system plan. Moreover, a boundary condition can relate to the positioning of connecting lines, so that the connecting lines are as short as possible for example, have few crossing points and/or merely consist of consecutive connected horizontal or vertical line sections. This may in particular enhance the legibility and clarity of a synthetic system plan.

In one form of embodiment of the training data generator the generator can further be designed to enhance and/or modify a synthetic system plan and/or merely at least one symbol of the synthetic system plan by means of artifacts provided.

In one form of embodiment of the training data generator the output module is designed to output this enhanced and/or modified synthetic system plan as an additional synthetic system plan.

An artifact in conjunction with embodiments of the invention can for example be a rotation, a contrast modification, a distortion or a fault line. Such artifacts are to be found as a rule on paper plans and/or digitized system plans. The generator makes it possible to generate synthetic plans that have similar artifacts. This makes possible the creation of realistic training examples and it increases the number of training examples.

In one form of embodiment the training data generator can further comprise a graphics module that is designed in such a way as to create a graphical representation of the synthetic system plan and the output module is further designed to output the graphical representation of the synthetic system plan.

In this case an advantage is that, for a graphical representation of a synthetic plan generated in this way, positions and dimensions of the symbols occurring on the system plan, connecting lines and/or annotations are known. Accordingly, such a synthetic system plan can advantageously be used for training an image detection module, since no (manual) extraction and/or identification of symbols is necessary.

In one form of embodiment the system plans can comprise circuit diagrams, function plans, and/or piping and instrument flow schemes.

In accordance with a second aspect of embodiments of the invention relates to a computer-implemented method for generating training datasets for training of a trainable image detection module, with the method steps:

reading in of symbols extracted from digital system plans for technical systems provided and a positioning rule provided for the positioning of a symbol in a system plan, wherein the system plans each depict a structure and/or a functionality of a technical system by means of symbols and are identical, wherein symbols depict the technical system or a technical function, and wherein the at least one positioning rule is directed to a relative positioning of the symbol on a system plan, a relative positioning of the symbol in relation to an annotation, a predetermined coupling to a further symbol, and/or a symbol-specific dependence on at least one further symbol, storage of the extracted symbols, random selection by means of a random generator of a symbol sub-quantity of the stored symbols, generation of at least one synthetic system plan as a function of the selected symbol sub-quantity and as a function of at least one positioning rule, and output of the at least one synthetic system plan as training data for training of a trainable image detection module.

Embodiments of the invention further relates to a computer program product (non-transitory computer readable storage medium having instructions, which when executed by a processor, perform actions) that is able to be loaded directly into a programmable computer, comprising program code sections that, when the program is executed by a computer, cause said computer to carry out the steps of an inventive method.

A computer program product can be provided or delivered for example on a storage medium, such as for example a memory card, USB stick, CD-ROM, DVD, a non-volatile/permanent storage medium (non-transitory storage medium) or also in the form of a downloadable file from a server in a network.

BRIEF DESCRIPTION

Some of the embodiments will be described in detail, with reference to the following figures, wherein like designations denote like members, wherein.

DETAILED DESCRIPTION

Figure 1:
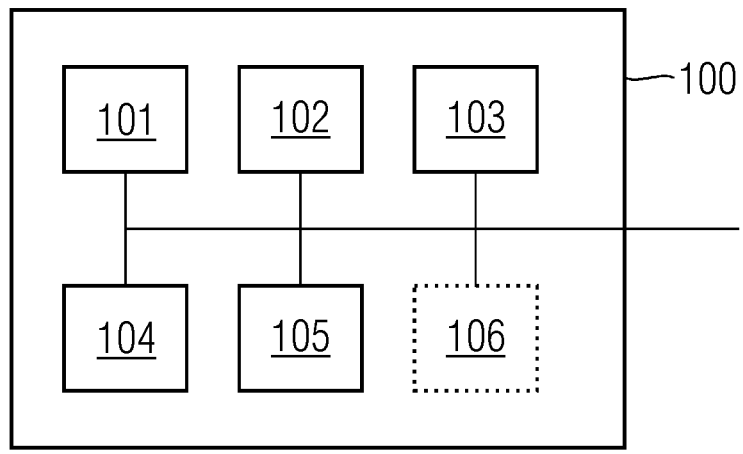
FIG. 1 shows an exemplary embodiment of an inventive training data generator in a schematic block diagram.

Parts that correspond to one another are provided with the same reference characters in all the figures.

In particular, the exemplary embodiments below merely show examples of possible realizations, such as in particular how such realizations of the inventive teaching could look, since it is impossible and also not expedient or necessary for understanding embodiments of the invention to name all these possible realizations.

FIG. 1 shows in a schematic block diagram an exemplary embodiment of an inventive training data generator 100.

The training data generator 100 can be embodied at least in part in hardware and/or software. The training data generator is coupled to a trainable image detection module, so that created training data for training of the image detection module can be transferred.

The training data generator 100 comprises an interface 101, which is designed in such a way as to read in symbols extracted from digital system plans for technical systems provided, wherein the system plans each depict a structure and/or a functionality of a technical system by means of symbols and are identical. System plans can for example be circuit diagrams, function plans, and/or piping and instrument flow schemes. Only symbols from system plans that are identical, such as for example only circuit diagrams, are read in, i.e., from plans that are similar.

For example, at least one symbol library for a system plan type that comprises a plurality of symbols for the same type of system plans can be read in via the interface 101. The extraction of the symbols from the existing system plans can be carried out in particular as an upstream step.

The interface 101 can further be designed additionally to read in at least one of the following items of information assigned to a respective symbol and to transfer it to the memory module for storage of this item of additional information:

- an item of information assigned to a symbol about a possible connection to another symbol, such as for example an existing interface/a port,
- an item of information for an annotation assigned to a symbol, such as for example a label,
- a form of representation of the symbol and/or part of the symbol, such as for example a rotation or mirror image, and/or
- an item of representation information of the symbol, such as for example size.

Moreover, a relative position in relation to the symbol and/or dimensions of the annotation can be read in for an annotation via the interface 101.

The interface 101 can further be designed to read in at least one positioning rule provided for the positioning of a symbol in a system plan. A positioning rule can be directed for example to a relative positioning of the symbol on a system plan, a relative positioning of the symbol in relation to an annotation, a predetermined coupling to a further symbol, and/or a symbol-specific dependence on at least one further symbol.

The training data generator further comprises a memory module 102, which is designed in such a way as to store the extracted symbols.

The training data generator moreover comprises a selection module 103, which is designed in such a way as to select at random, by means of a random generator, a symbol sub-quantity of the stored symbols. The selection module 103 is in particular coupled to the memory module 102. The selected symbol sub-quantity is transferred from the selection module 103 to a generator 104 of the training data generator 100.

The generator 104 is designed in such a way as to generate at least one network list or a synthetic system plan as a function of the selected symbol sub-quantity. In particular, the generator 104 can generate a network list or a synthetic system plan as a function of at least one item of additional information read in, to which a symbol is assigned, and/or at least one positioning rule. In addition, in the generation of the network list or of the synthetic system plan, at least one predetermined boundary condition can be taken into account. A boundary condition can for example be a format of the system plan. A boundary condition can in particular be dependent on the type of the system plan.

The generator 104 can moreover enhance and/or modify a synthetic system plan and/or merely at least one symbol of the synthetic system plan by means of artifacts provided. An artifact can for example relate to a contrast and/or distortion of a symbol.

The training data generator 100 further comprises an output module 105, which is configured in such a way as to output the network list, the at least one synthetic system plan and/or a synthetic system plan modified/enhanced by means of artifacts as training data for training of a trainable image detection module, wherein the trainable image detection module is designed to generate a digital system plan with the aid of an analog system plan of a technical system.

The training data generator 100 can further also comprise a graphics module 106. The training data generator 100 can also merely be coupled to such a graphics module 106. The graphics module 106 is designed in such a way as to create a graphical representation of the synthetic system plan. For example, a graphical representation can be created from the network list.

Figure 2:
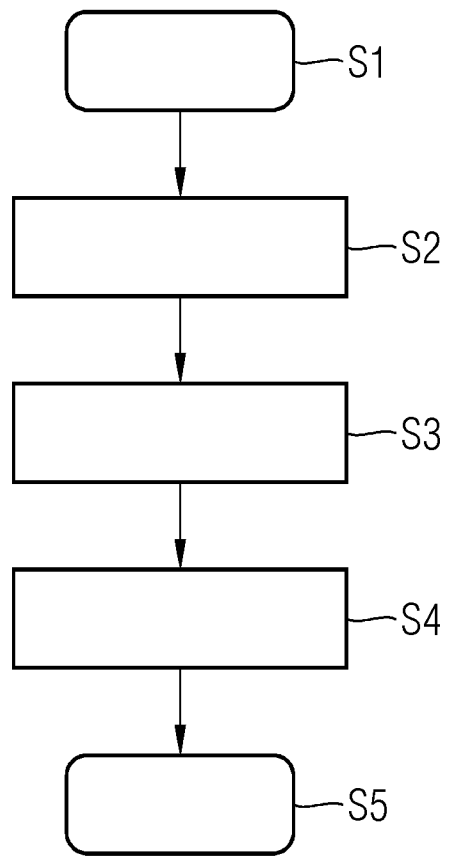
FIG. 2 shows an exemplary embodiment of an inventive method for generation of training datasets for training of a trainable image detection module.

FIG. 2 shows a flow diagram of an inventive computer-implemented method for generation of training datasets for training of a trainable image detection module, which is designed to generate a digital system plan with the aid of an analog system plan of a technical system. With the method training data can be generated for the image detection module in order to improve its detection accuracy First of all, in a first step S1, a plurality of system symbols is read in. These are extracted from already digitized system plans provided. For example, a symbol library can be provided for a predetermined system plan type, such as for example circuit diagrams.

In the next step S2 the extracted symbols are stored (buffered).

As a next step S3, a symbol sub-quantity of the stored symbols is selected at random by means of a random generator. The random generator can for example output a set of random numbers. These random numbers can be used to select symbols from the symbol library.

In the next step S4, depending on the selected symbol sub-quantity, at least one network list or a synthetic system plan is generated. A plurality of different network lists or synthetic system plans is generated.

The generated synthetic system plans can in particular be output in a graphical representation. Moreover, a synthetic system plan can be modified by means of artifacts in such a way that a further synthetic system plan can be output.

As a next step S5, the generated synthetic system plans are output as training data for training of a trainable image detection module. In addition, or as an alternative just the created network lists can also be output. For example, subsequently the trainable image detection module is trained by means of the training data, to generate a digital system plan with the aid of an analog system plan, for example a scanned paper plan, of a technical system.

Figure 3:
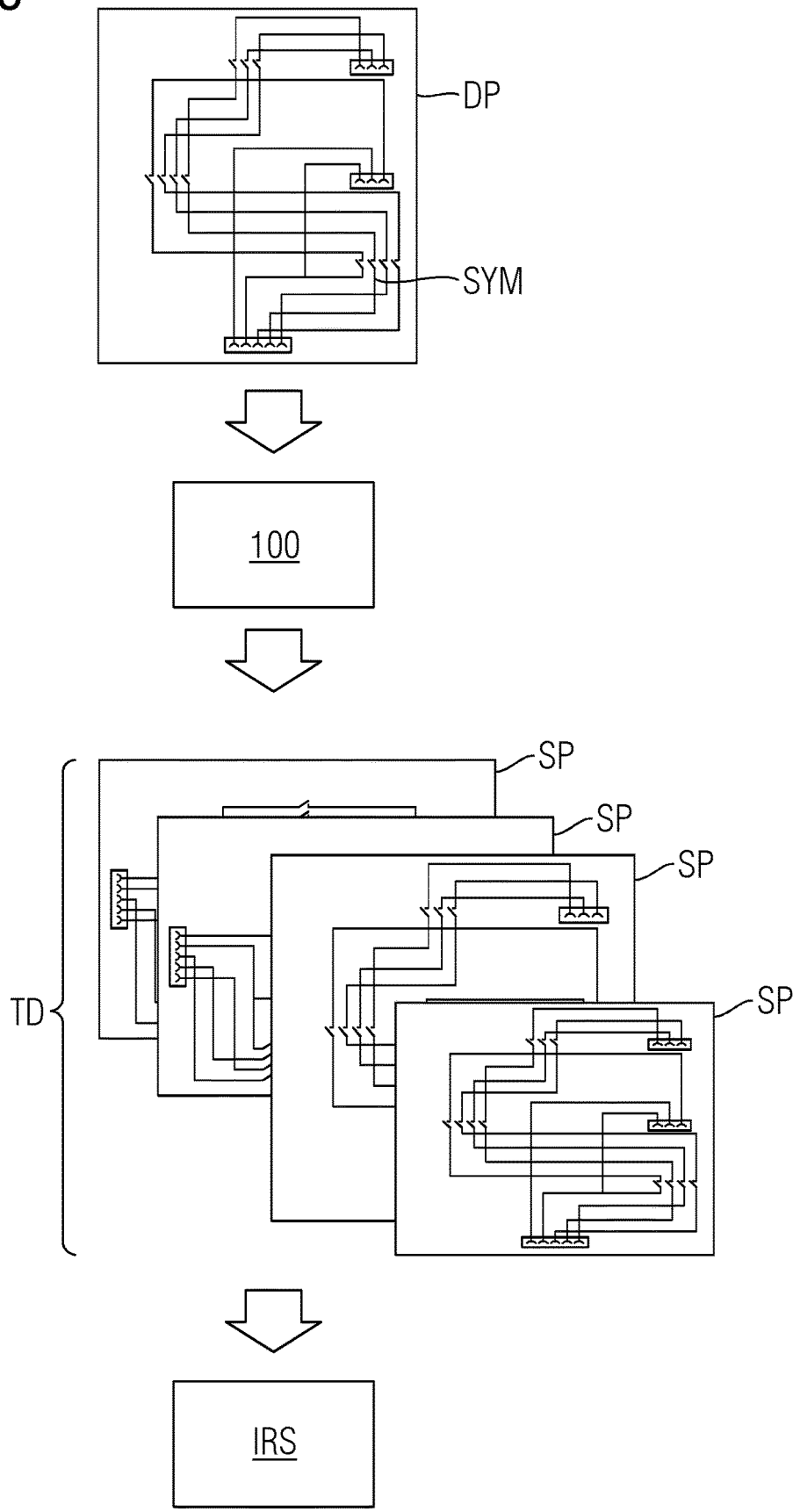
FIG. 3 shows a further exemplary embodiment of an inventive method for generation of training datasets for training of a trainable image detection module.

FIG. 3 shows a further exemplary embodiment of the invention in a schematic diagram.

A digital system plan DP is shown for example, which comprises a plurality of symbols SYM. For instance, this may involve a digitized paper plan. The symbols can be extracted from the digital system plan DP and for example provided as a symbol library to a training data generator 100. A plurality of symbols SYM is provided from a plurality of digital system plans DP.

In addition, an item of additional information assigned to the symbol can be extracted and provided for an extracted symbol SYM. An item of additional information can for example comprise an item of information about a possible connection to another symbol, for example an available interface. An item of additional information can also be an item of information about an annotation assigned to the symbol, for example a name or designation. Moreover, an item of additional information can relate to a form of representation of the symbol and/or to representation information of the symbol, such as for example a symbol size, font size or formatting (for example dashed lines).

As an alternative or in addition a positioning rule can be provided for an extracted symbol. A positioning rule can relate for example to a relative positioning of the symbol on the system plan, to an annotation, a predetermined coupling to a further symbol and/or a symbol-specific dependence on at least one further symbol. In this way for example a respective symbol can be characterized in that it is typically positioned in a predetermined edge area of the system plan, a symbol designation is located in a predetermined relative position in relation to the symbol and/or can be coupled to a predetermined further symbol.

Accordingly, by cutting them out from existing digital system plans DP for example, a library of symbols SYM can be put together, which contains the graphical hallmark of the symbols SYM, the location of the connection points (which is used for connection to connecting points of other symbols) and the position of annotations such as object or connection names. Moreover, information about width, color and manner of representation (for example solid, dashed, dotted etc.) of the existing types of connecting lines and also for representing crossing points of the library can be added. For annotations it can further be defined whether their position is fixed or variable in relation to the symbol or the associated connection point. Moreover, if specified, which font type with associated parameters (size, character spacing etc.) will be used for the annotation. If the text contained in the annotations follows specific rules (for example always consists of three characters or begins with an uppercase letter), a regular expression can be stored for such a rule. It is also possible to store whether a symbol occurs only in its original orientation or also in rotated or mirrored variants, and which annotations are rotated as well or are retained in the original orientation. Moreover for example, positioning rules for the interconnection of symbols in the synthetic plans can be defined. For example, connection points can have different types and only be joined by connecting lines of a specific manner of representation. Furthermore, it can be defined for a group of connection points that the group must be connected in the manner of a bus in parallel to another group of connection points. This information/additional information can be assigned to the respective symbols SYM and stored in this way.

The extracted symbols SYM and the assigned additional information are input into the training data generator 100. There a sub-quantity of symbols is selected at random from this symbol set. For example, network lists with randomly chosen symbols from the library, a random connection of their connection points, but one that follows the stored rules, as well as randomly chosen annotations (but satisfying the specified syntax/format) can be created. This can in particular be independent of whether the created network list, with regard to the described connection of the components described by the symbols, represents a sensible system, or whether the created connection is physically possible at all.

The training data generator 100 generates with the aid of the selected symbols at least one network list, from which a synthetic system plan SP is created. To this end an algorithm for creating the network list or the synthetic system plan can be employed. In this case the positioning rules and/or predetermined boundary conditions in particular assigned to the symbols are taken into account for the system plan to be generated in each case. In this way this algorithm can place the symbols, connections and annotations from the network list on a plan page so that for example the connecting lines are as short as possible and the fewest possible crossing points arise, and also no unnecessary overlaps are produced. As a boundary condition the algorithm can moreover take account of connecting lines only consisting of consecutively connected horizontal or vertical line sections, which is desirable in many schematic plans for reasons of clarity. A plurality of synthetic system plans is generated and output in a graphical form of representation.

Starting from the network list and the generated layout, graphical representations of the synthetic system plans can be generated in each case. In this case, since the system plans are synthesized from the library, the positions and dimensions of symbols, connecting lines and annotations occurring on then system plans are known. This facilitates in particular the training of the image detection module IRS, since thereafter both input data and also output data is present for the training.

Moreover, by augmentation the generated synthetic system plans can be enhanced by further typical artifacts, such as for example rotation, contrast, distortions, fault lines. Typically real system plans have such artifacts. Through this modification or enhancement the synthetic system plans can be enhanced by further examples and/or realistically designed.

The generated synthetic system plans SP are output as training data TD. The training data TD can be used for training a trainable image detection module IRS. The training data comprises the synthetic system plans and contains assigned items of information in each case in relation to the symbols and assigned annotations contained in the system plans. The trainable image detection module IRS comprises a method for machine learning, for example an artificial neural network. This can be trained by means of the training data TD. During training the synthetic system plans are transferred as input data to the trainable image detection module IRS, for example. Target values, i.e., output data of the image detection module IRS, are for example symbols and assigned annotations.

Such a trained image detection module IRS can be designed, with the aid of an analog system plan of a technical system, to generate a digital system plan, i.e., for example to digitize it with the aid of a scan of a paper plan. In this case for example the trained image detection module IRS can detect and output symbols on the scanned system plan.

The described method is in particular advantageous since the variance to which the symbols are subject in their use can be described in the form of rules. In one symbol library, as well as the graphical hallmark of the symbols and connecting lines per se, which deliver the building blocks for additive generation of the synthetic plans, in addition these types of rule are adhered to for possible forms of use of the symbols and connections. The rules can for example relate to the placing of annotations of the symbols, the use of connections, mutual dependencies etc. Through such rules, which for example can also be predetermined by a domain expert, numerous variants of the placing of symbols, connections and annotations can be created in the generated training examples. This enables the machine learning method to be optimized in the training process with additional helpful information for detection of the symbols. Numerous variants can be created that could occur in real plans, even if they do not occur in the plans that actually exist.

For each symbol, which can occur on the training examples, in particular just one entity on a digital (real) system plan (or the symbol legend of such an entity) is needed. If specific symbols are not detected by the trained detection algorithm with sufficient accuracy, further training examples that contain this symbol can be created if required. Also, for the detection of difficult groupings of a number of symbols, texts and connections, an adjustment can be explicitly made by the synthetic plan generation and the training dataset can thus be supplemented in order to improve the detection accuracy. The synthetic plans can combine symbols from different symbol libraries in order to make possible an improved general applicability for the machine learning method. If new symbols of a symbol library to be detected are added, further synthetic system plans can be generated as training data for this in a simple way. The synthetic system plans can moreover be combined with annotated real system plans in order to further enhance the training data.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A training data generator for generating training data to be used for training a trainable image detection module to generate a digital system plan of a digital system with an aid of an analog system plan of the technical system, said training data generator comprising:
an interface, designed to read in (i) symbols extracted from digital system plans for technical systems and (ii) a positioning rule provided for the positioning of a symbol in a digital system plan, wherein the digital system plans each depict a structure and/or a functionality of the technical system by means of symbols, wherein the digital system plans are of an identical type, wherein the extracted symbols depict the technical system or a technical function, and wherein the at least one positioning rule for the positioning of a symbol in the digital system plan is directed to a relative positioning of the symbol in relation to an annotation, a predetermined coupling of the symbol to a further symbol, and/or a symbol-specific dependence of the symbol on at least one further symbol,
a memory module, which is designed in such a way as to store the extracted symbols,
a selection module, which is designed in such a way as to select at random by means of a random generator a symbol sub-quantity of the stored symbols,
a generator, which is designed in such a way as to generate at least one synthetic system plan as a function of the selected symbol sub-quantity and as a function of the positioning rule, and
an output module, which is designed in such a way as to output the at least one synthetic system plan as training data for training the trainable image detection module to generate the digital system plan of digital system with the aid of the analog system plan of the technical system.

2. The training data generator as claimed in claim 1, wherein the interface is designed to read in at least one item of additional information assigned to a respective symbol and to transfer the at least one item to the memory module for storing the at least one item, wherein the at least one item comprises:
an item of information assigned to a symbol about a possible connection to another symbol, and/or
an item of information about an annotation assigned to a symbol.

3. The training data generator as claimed in claim 2, wherein the interface is designed to read in for an annotation a relative position in relation to the symbol and/or dimension of the annotation.

4. The training data generator as claimed in claim 1, wherein the generator is designed to generate the at least one synthetic system plan as a function of an item of additional information.

5. The training data generator as claimed in claim 1, wherein the generator is designed to generate the synthetic system plan while taking into account at least one predetermined boundary condition of the synthetic system plan.

6. The training data generator as claimed in claim 1, wherein the generator is designed to create and/or to modify the synthetic system plan and/or at least one symbol of the synthetic system plan by means of artifacts provided.

7. The training data generator as claimed in claim 6, wherein the output module is designed to output the created and/or modified synthetic system plan as an additional synthetic system plan.

8. The training data generator as claimed in claim 1, comprising a graphics module, which is designed in such a way as to create a graphical representation of the synthetic system plan and the output module is designed to output the graphical representation of the synthetic system plan.

9. The training data generator as claimed in claim 1, wherein the synthetic system plans comprise circuit diagrams, function plans, and/or piping and instrument flow schemes.

10. A computer-implemented method for generating training data to be used for training a trainable image detection module to generate a digital system plan of a digital system with an aid of an analog system plan of the technical system, said method comprising:
reading in of (i) symbols extracted from digital system plans for technical systems and (ii) a positioning rule provided for the positioning of a symbol in a digital system plan, wherein the digital system plans each depict a structure and/or a functionality of the technical system by means of symbols, wherein the digital system plans are of an identical type, wherein the extracted symbols depict the technical system or a technical function, and wherein the at least one positioning rule for the positioning of a symbol in the digital system plan is directed to a relative positioning of the symbol in relation to an annotation, a predetermined coupling of the symbol to a further symbol, and/or a symbol-specific dependence of the symbol on at least one further symbol,
storing the extracted symbols,
randomly selecting, by means of a random generator, a symbol sub-quantity of the stored symbols,
generating at least one synthetic system plan as a function of the selected symbol sub-quantity and as a function of the positioning rule, and
outputting the at least one synthetic system plan as training data for training the trainable image detection module to generate the digital system plan of digital system with the aid of the analog system plan of the technical system.

11. A computer program product, comprising a computer readable hardware storage device having computer readable program code stored therein, said program code executable by a processor of a computer system to implement a method that is able to be loaded directly into a programmable computer, comprising program code sections that are suitable for carrying out the method as claimed in claim 10.

12. The training data generator as claimed in claim 1, wherein said to generate the digital system plan of digital system with the aid of the analog system plan of the technical system comprises to digitize the synthetic system plan with an aid of a scan of a paper plan.

* * * * *